US012755044B2

(12) United States Patent
Freeman et al.

(10) Patent No.: US 12,755,044 B2
(45) Date of Patent: Oct. 6, 2026

(54) ENCRYPTED DISTRIBUTED DATABASE ON A MOBILE DEVICE

(71) Applicant: Bank of America Corporation, Charlotte, NC (US)

(72) Inventors: Ion Freeman, Manchester Center, VT (US); Manu Kurian, Dallas, TX (US); Ganesh Bonda, Weddington, NC (US); Aeric Solow, Richardson, TX (US); Sasikumar Purushothaman, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/252,155

(22) Filed: Jun. 27, 2025

(65) Prior Publication Data

US 2025/0328674 A1 Oct. 23, 2025

Related U.S. Application Data

(62) Division of application No. 18/204,499, filed on Jun. 1, 2023, now Pat. No. 12,380,233.

(51) Int. Cl.
*G06F 21/62* (2013.01)
*G06F 11/1446* (2026.01)
*G06F 21/60* (2013.01)

(52) U.S. Cl.
CPC ...... *G06F 21/6218* (2013.01); *G06F 11/1464* (2013.01); *G06F 21/606* (2013.01)

(58) Field of Classification Search
None
See application file for complete search history.

*Primary Examiner* — Eddy Cheung
(74) *Attorney, Agent, or Firm* — Weiss & Arons LLP

(57) ABSTRACT

A method for enabling continuity of access to a primary dataset stored in a computer network is provided. The method utilizes a node, a computer processor, and non-transitory computer-readable media storing computer-executable instructions. The node is connected to the computer network. The method includes configuring the mobile device for wireless connection to the computer network. The method includes configuring the mobile device to receive indication that the node is disconnected from the computer network and transmit a copy of the primary dataset or a portion thereof from the computer network to the node. The method includes configuring the node to enable operations on the dataset copy and keep a record of them. The method includes configuring the node to receive indication that the node is connected to the computer network and transmit the record to the computer network.

11 Claims, 5 Drawing Sheets

ENCRYPTED DISTRIBUTED DATABASE ON A MOBILE DEVICE

CROSS REFERENCE TO RELATED APPLICATION

This application is a divisional of U.S. patent application Ser. No. 18/204,499, filed on Jun. 1, 2023 and entitled "ENCRYPTED DISTRIBUTED DATABASE ON A MOBILE DEVICE," which is incorporated herein by reference in its entirety.

FIELD OF TECHNOLOGY

Aspects of the disclosure relate to methods and systems for enabling continuity of access to data stored in computer networks.

BACKGROUND OF THE DISCLOSURE

Network failures can be challenging and at times damaging to systems that require ongoing access to data. Manufacturing plants, delivery fleets, and inventory tracking are just a few examples of activities that depend on continuous network access. Interruptions in data access can halt ongoing operations of businesses and governmental or non-governmental organizations. In some cases, the ability to perform real-time operations on data stored in the network is critical for such operations. Furthermore, continuing operations during interruptions to dataset access may result in a record keeping gap that is difficult or nearly impossible to repair retroactively.

Improved methods for maintaining ongoing data access are urgently needed.

SUMMARY OF THE DISCLOSURE

It is an object of this invention to enable continuity of access to data stored in computer networks.

It is a further object of this invention to establish a failover system that can enable continuation of operations during and/or after network failures.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically enable access to network-stored data, even during network failures, and perform various other activities, as described herein.

Embodiments of the system, as described herein, leverage makeshift backup databases, which may be housed on mobile devices, and/or other complex, specific-use computer systems to provide a novel approach for enabling continuous operations of computerized systems. The system utilizes processors, which may include machine learning models, to efficiently configure secure and reliable backup systems.

As such, the present disclosure provides a technical solution to a technical problem of network outages and resulting interruptions in network-dependent operations.

The present disclosure improves upon conventional approaches by providing a system for ongoing network access, by using mobile devices that are typically used for routine uses, such as telephone conversations and traditional smartphone applications.

A method in accordance with principles of the disclosure may enable continuity of access to a primary dataset stored in a computer network. The method may utilize a computer processor and one or more non-transitory computer-readable media storing computer-executable instructions. The instructions, when executed by the computer processor, may create a backup dataset. The method may include the steps of:

- creating a backup dataset, including a copy of the primary dataset or a portion of it;
- distributing the backup dataset among a plurality of mobile devices; and
- instructing the mobile devices to store the backup dataset in encrypted form, in a stable storage or memory location.

The backup dataset may be stored on the mobile devices such that subsequent decryption of the dataset may require cooperation of at least two of the mentioned mobile devices.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
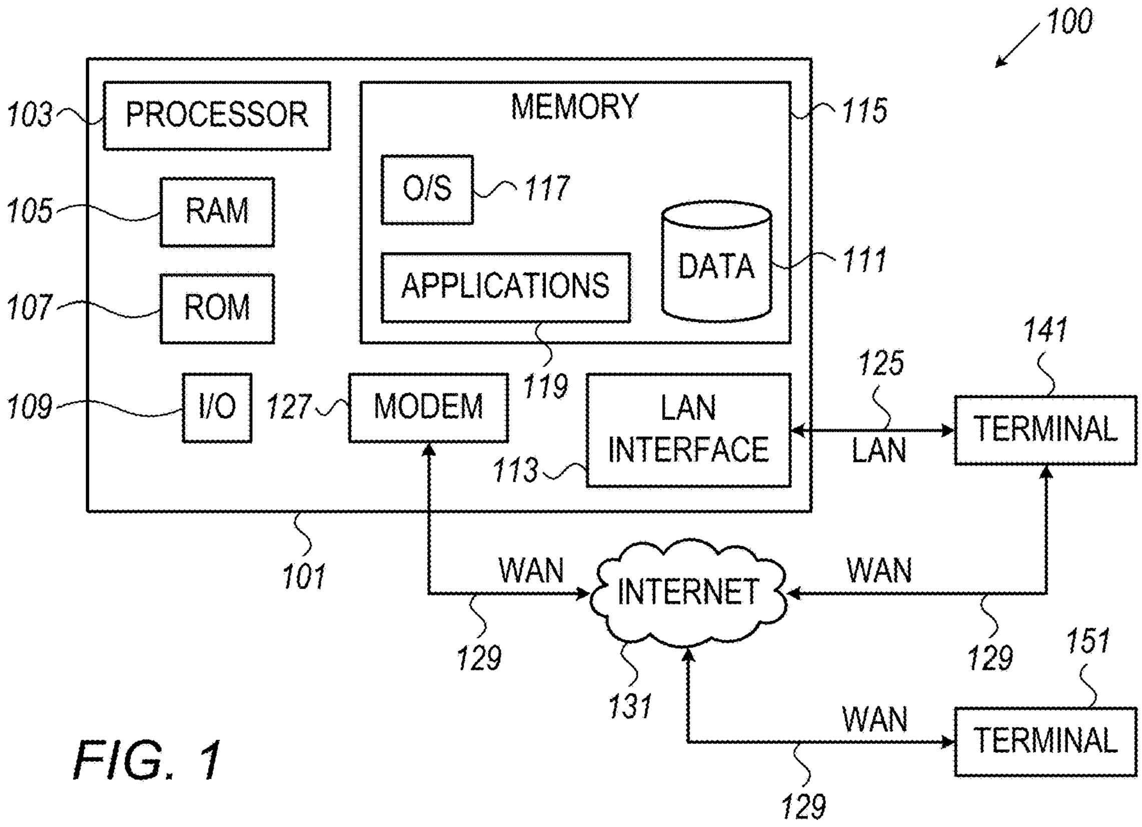
FIG. 1 shows an illustrative system in accordance with principles of the disclosure.

Systems and methods are described for proactively designing, creating, and utilizing makeshift backup databases, and/or other complex, specific-use computer systems to provide a novel approach for enabling ongoing access to computer networks and data stored on networks.

A method in accordance with principles of the disclosure may be implemented by a computer and/or be automated.

A method in accordance with principles of the disclosure may utilize a computer processor and one or more non-transitory computer-readable media storing computer executable instructions. The instructions, when executed by the computer processor, may automatically restore access to data in the event of network failures.

A method in accordance with principles of the disclosure may enable continuity of access to a primary dataset stored in a computer network. The method may utilize a computer processor and one or more non-transitory computer-readable media storing computer-executable instructions. The instructions, when executed by the computer processor, may create a backup dataset. The method may include the steps of:

creating a backup dataset, including a copy of the primary dataset or a portion of it;

distributing the backup dataset among a plurality of mobile devices; and instructing the mobile devices to store the backup dataset in encrypted form, in a stable memory or storage location.

The computer processor may direct all, or a portion of, all the aforementioned steps.

Reference herein to stable memory or a stable storage location may indicate that the storage is configured to not be erasable by routine usage of the mobile device. In some aspects, the stable memory cannot be erased from the mobile device without permission from a network administrator. Such features may ensure ongoing availability of the backup network without requiring prior notice.

The described methods may enable secure continuity of access to data stored on computer networks. The methods may also enable operations to be securely performed on the data. In some aspects, a business or governmental or non-governmental institution may rely on various computer-operated systems for ongoing operations of facilities such as manufacturing plants, delivery fleets, and inventory tracking. Access to a subset of the data stored on a network may be sufficient for continuation of ongoing system operations. In such cases, data needed for ongoing system operations may be selectively included in the described backup dataset.

The mentioned backup dataset may be stored on the mobile devices such that subsequent decryption of the dataset requires cooperation of at least two of the mentioned mobile devices. In some aspects, a key pair may be used to control, or gatekeep, decryption of the backup dataset.

In some aspects, a symmetric key algorithm may be used to secure the network. In some aspects, an asymmetric key algorithm may be used to secure the network. Asymmetric-key encryption may be used to exchange a secret key for symmetric-key encryption. In some aspects, a shared key must be separately accessed by two (or more) mobile devices, in order for the devices to exchange information. In some aspects, separate keys must be accessed by two (or more) mobile devices (e.g., each device having its own unique key), in order for the devices to exchange information. Concurrent access on the separate devices may be required to allow exchange of information.

Split knowledge between 2 mobile devices in the network may be used to prevent unauthorized access by an entity that breaches the security of one device. The split knowledge may include 2 or more devices separately having key components, where each device stores only its own key component. Each device may require a login from its own (separate) user, in order for the devices to share decrypted information. The logon may be controlled by a PIN, password, or biometric authentication that unlocks the mobile device for general use. In other aspects, the logon may be a password or PIN dedicated to the described backup network.

In some aspects, the split knowledge may include 2 or more users, or 2 or more devices, separately having key components, where each user knows only its own key component key. The key components may individual each contain insufficient information to decipher the original cryptographic key. In other aspects, 3 or more devices, 4 or more devices, 5 or more devices, 7 or more devices, 10 or more devices, or 20 or more devices must be accessed in order to decipher the cryptographic key.

Dual control may be used to prevent unauthorized access by a hacker that succeeds in breaching one device. The dual control may require two or more users to perform a function (for example, logging in to their mobile device, or entering a password dedicated to the described backup network). Each individual user may be unable to access or use the authentication credentials of another user.

In some aspects, both split knowledge and dual control are used to secure the described backup network.

In some aspects, a password specific to the described backup network is distributed to the mobile devices in the network. Each mobile device may receive a unique password. A cryptographic key generation module may be configured for the purpose of generating cryptographic keys for the described backup network.

In some aspects, two or more of the mobile devices utilize a distributed ledger technology (DLT) to gatekeep data operations, or to prevent unauthorized data operations or access. The DLT may be a digital system for recording data and data manipulations in multiple places at the same time. Each node (in this case, each mobile device) may process and verify every item, thus generating a record of each item and creating a consensus on its veracity.

Each block, or data record, may be digitally signed with a "hash"—the result of a mathematical algorithm—that is based on the contents of the record and every other record in the blockchain. If any of the records are subsequently changed, the computed hash may no longer match the original hash, and the change will be detected. If an unauthorized user who has breached a single device attempts to perform a data operation, or access data stored in the backup database, the other devices may be configured to automatically block the operation.

The described method may further include the step of automatically updating the backup dataset by importing updates to the primary dataset. Mobile devices in the network may be configured to automatically receive updates during normal network operation, for example as long as the network is intact.

In some aspects, a processor associated with the computer network is configured to receive indication that the network, or a portion of the network, is unavailable or not properly functioning. The signal may be generated from art-known methods of detecting and reporting network outages. The processor may then signal the mobile devices to activate the described backup network. The mobile devices may already be configured to operate the backup network, such that they can immediately do so upon receiving the signal from the processor.

In some aspects, one subset of the mobile devices is/are designated edge-layer device(s), and a second subset of the mobile devices is/are designated platform-layer device(s). The edge-layer device(s) may be configured to communicate with external entities and networks. The edge-layer device(s) may be configured to filter information and data received from the external sources and/or to detect and block malicious code and/or other damaging items. In some aspects, 2 or more, 3 or more, 4 or more, 5 or more, 7 or more, or 10 or more mobile devices are designated edge-layer devices. In some aspects, 2 or more, 3 or more, 4 or more, 5 or more, 7 or more, or 10 or more mobile devices are designated platform-layer devices.

The described method may further include the step of establishing a trusted communication path between at least one of the edge-layer device(s) and at least one of the platform-layer device(s). The communication path may enable data to be securely exchanged between information stored in the platform layer (or other inner layers of the network) and entities external to the network. In some aspects, one edge-layer device is designated as the gateway between the edge-layer network and the platform-layer network. In some aspects, the gateway devices constitutes a separate layer between the edge-layer network and the platform-layer network.

Split knowledge between edge-layer devices and the platform-layer devices may be used to prevent unauthorized access by an entity that breaches the security of one device. The split knowledge may include 2 or more devices separately having key components, where each device stores only its own key component. Each device may require a login from its own (separate) user, in order for the devices to share decrypted information. The logon may be controlled by a PIN, password, or biometric authentication that unlocks the mobile device for general use. In other aspects, the logon may be a password or PIN dedicated to the described backup network.

In some aspects, the split knowledge may include the edge-layer device(s) and the platform-layer device(s) separately having key components, where each layer knows only its own key component key. The individual key components may each contain insufficient information to decipher the original cryptographic key.

The split knowledge may be between an edge-layer device designated as the gateway and the platform-layer devices; or between a separate gateway device and the platform-layer; or between the edge layer and a separate gateway device.

Dual control may be used to prevent unauthorized access by a hacker that succeeds in breaching one device. The dual control may require edge-layer device(s) and platform-layer device(s) to perform a function (for example, logging in to their mobile device, or entering a password dedicated to the described backup network). Each individual user may be unable to access or use the authentication credentials of another user.

The split knowledge may be between an edge-layer device designated as the gateway and the platform-layer devices; or between a separate gateway device and the platform-layer; or between the edge layer and a separate gateway device.

In some aspects, both split knowledge and dual control are used to secure the described backup network.

In some aspects, the described mobile devices are organized in a distributed network. The distributed network may be organized such that each node (e.g., each mobile device) can communicate with the other nodes without traversing a centralized point. The edge-layer devices may be organized in their own distributed network. The platform-layer devices may be organized in their own distributed network. In some aspects, both the edge-layer and the platform-layer devices may each be organized in separate distributed networks.

In some aspects of the described methods and systems, the primary or original dataset is updated in real-time on modifications in the backup dataset. The updates may be via mobile devices, a radiocommunication network, or the like, as described herein. The updates may modify the primary or original dataset to reflect modifications made in the backup dataset.

In some aspects, there is provided a method for accessing and utilizing a principal dataset stored in a central network, while the central network is inaccessible, in accordance with principles of the disclosure. The method may include the following steps:

- programming the computer processor via the computer-executable instructions to:
  - create a backup dataset, the backup dataset including a copy of the principal dataset or a portion of the dataset; and
  - distribute the backup dataset among a more than one mobile devices associated with the central network, where:
    - the mobile devices are configured to store the backup dataset in encrypted form, in a stable memory or storage location;
    - decryption of the backup dataset requires cooperation of at least two of them mentioned mobile devices; and
    - the backup dataset is by default locked to data manipulations, excepting updates received from the central network;
- upon receipt of indication that the central network is inaccessible, instructing the mobile devices to enable operations on the backup dataset; and
- upon receipt of indication that the central network is once again accessible, updating the principal dataset by importing the backup dataset into the central network.

The method may also include the step of locking the backup dataset to manipulations, modifications, and/or operations upon receipt of indication that the central network is accessible.

The referred-to dataset modifications and operations may include modifications of datapoints in the dataset. For example, records of inventory, resource allocation, health-care records, and financial holdings may need to be updated to reflect ongoing activities.

In some aspects, dataset modifications or operations may include transfer of data within the backup network. In some aspects, data is transferred between different storage locations in the backup dataset. The architecture of the backup dataset may be designed to reflect the architecture of the principal or original dataset or network. When network access is restored, movement of data within the backup dataset may be recapitulated in the principal dataset or network.

In some aspects, the computer processor is additionally programmed to lock the principal dataset to operations, upon receipt of indication that the central network is inaccessible.

In some aspects, there is provided a method for enabling continuity of access to a primary dataset stored in a computer network, in accordance with principles of the disclosure. The method may utilize a node connected to the computer network, a computer processor, and non-transitory computer-readable media storing computer-executable instructions. The instructions, when executed by the computer processor, may configure the node to securely connect to a mobile device. The method may include the following steps:

- configuring a mobile device for wireless connection to the computer network;
- configuring the mobile device to receive indication that the node is disconnected from the computer network, and (e.g., after receiving the indication) transmit a copy of the primary dataset or a portion thereof from the computer network to the node;
- configuring the node to enable operations on the dataset copy and keep a record of them; and
- configuring the node to receive indication that the node is connected to the computer network and (e.g., after receiving the indication) transmit the record to the computer network.

In some aspects, each of the aforementioned steps is directed by a processor, which may be associated with the computer network.

The described method may allow continuous or uninterrupted access to a computer network or a dataset stored on the network or on a portion of the network, for example a dataset containing data necessary for needed operations. Access may be enabled at times when a network is dysfunctional or loses connectivity, or when part of the network loses connectivity to the rest of the network.

In some aspects, execution of operations on the backup dataset copy generates a modified dataset copy. The modified copy may be stored in the backup network. When the node is reconnected to the original network, the modified dataset copy may be transmitted to the network.

In some aspects of the described methods and systems, the primary or original dataset is updated in real-time on modifications in the backup dataset. The updates may be via mobile devices, a radiocommunication network, or the like, as described herein. The updates may modify the primary or original dataset to reflect modifications made in the backup dataset.

The described methods and systems may utilize real-time network outage sensors. Such sensors are known in the art and are commercially available, for example from ManageEngine (Pleasanton, CA), Paessler AG (Nuremberg, DE), and Datadog (New York, NY).

The described wireless connection may include, or utilize, a radiocommunication network.

In some aspects, one subset of the mobile devices is/are designated edge-layer device(s), and a second subset of the mobile devices is/are designated platform-layer device(s). The edge-layer device(s) may be configured to communicate with external entities and networks. The edge-layer device(s) may be configured to filter information and data received from the external sources and/or to detect and block malicious code and/or other damaging items.

The described method may further include the step of establishing a trusted communication path between at least one of the edge-layer device(s) and at least one of the platform-layer device(s). The communication path may enable data to be securely exchanged between information stored in the platform layer (or other inner layers of the network) and entities external to the network. One or more edge-layer devices may act as a gateway between the edge layer and platform layer.

In some aspects, the described mobile devices are organized in a distributed network. The distributed network may be organized such that each node (e.g., each mobile device) can communicate with the other nodes without traversing a centralized point. The edge-layer devices may be organized in their own distributed network. The platform-layer devices may be organized in their own distributed network. In some aspects, both the edge-layer and the platform-layer devices may each be organized in separate distributed networks.

The described method may further include the step of configuring the described mobile device and network to require cooperation between the mobile device and the network. The cooperation may enable transmission of the dataset copy from the computer processor to the mobile device.

The described method may further include the step of configuring the described mobile device and node to require cooperation between the mobile device and the node, to enable transmission of the dataset copy from the mobile device to the node.

The described method may further include the step of configuring the described network, mobile device, and node to require cooperation between the network, mobile device, and node, to enable transmission of the dataset copy from the network to the node.

In some aspects, the node is configured to communicate with other nodes that are disconnected from the primary network but are connected to the described node by a local area network (LAN). Doing so may create a backup computer network.

In some aspects, one subset of the nodes in the LAN is/are designated edge-layer node(s), and a second subset of the nodes is/are designated platform-layer node(s). The edge-layer node(s) may be configured to communicate with external entities and networks. The edge-layer node(s) may be configured to filter information and data received from the external sources and/or to detect and block malicious code and/or other damaging items.

The described method may further include the step of establishing a trusted communication path between at least one of the edge-layer node(s) and at least one of the platform-layer node(s). The communication path may enable data to be securely exchanged between information stored in the platform layer (or other inner layers of the network) and entities external to the network.

In some aspects, there is provided a system for enabling continuity of access to a primary dataset stored in a computer network, in accordance with principles of the disclosure. The system may include the computer network, the network including a plurality of nodes and housing, or storing, the primary dataset. The system may also include:

- a computer processor associated with at least one of the network nodes;
- one or more non-transitory computer-readable media storing computer-executable instructions; and
- a radiocommunication network.

The instructions, when executed by the computer processor, may configure at least one of the nodes to be securely connectable to the radiocommunication network.

The computer network may be configured to connect to the radiocommunication network.

The node may be configured to:

- receive indication of its disconnection from the computer network;
- (e.g., when a disconnection notification is received), receive a copy of the primary dataset or a portion of the dataset from the Computer the network, via radiocommunication network;
- enable operations on the copy;
- keep a record of the operations;
- receive notification that the node is once again connected to the computer network;
- (e.g., when a reconnection notification is received), transmit the record of operations to the computer network.

The mentioned copy of the primary dataset or a portion of the dataset may be received from another node of the computer network. The other node may be a node still connected to the primary computer network.

The described system may allow continuous or uninterrupted access to a computer network or a dataset stored on the network or on a portion of the network, for example a dataset or portion thereof containing data necessary for needed operations. Access may be enabled at times when a network is dysfunctional or loses connectivity, or when part of the network loses connectivity to the rest of the network.

In some aspects, execution of operations on the backup dataset copy generates a modified dataset copy. The modified copy may be stored on the disconnected node. When the node is reconnected to the original network, the modified dataset copy may be transmitted to the network.

The referred-to dataset operations may include modifications of datapoints in the dataset. For example, records of inventory, resource allocation, and financial numbers or metrics may need to be updated to reflect ongoing activities.

In some aspects, dataset operations may include transfer of data within the backup dataset stored on the disconnected node. In some aspects, data is transferred between different storage locations in the backup dataset. The architecture of the backup dataset may be designed to mirror the architecture of the principal or original dataset or network. When network access is restored, movement of data within the backup dataset may be recapitulated in the principal dataset or network.

The described node and network may be configured to require cooperation between them. The cooperation may enable transmission of the dataset copy from the network to the node.

The described network, processor, and node may be configured to require cooperation between them. The cooperation may enable transmission of the dataset copy from the network to the node.

The mentioned primary dataset may be stored on the network such that subsequent transfer of the dataset to the node requires cooperation between the node and the network. In some aspects, a key pair may be used to control, or gatekeep, decryption of the backup dataset.

In some aspects, a symmetric key algorithm may be used to secure the network. In some aspects, an asymmetric key algorithm may be used to secure the network. Asymmetric-key encryption may be used to exchange a secret key for symmetric-key encryption. In some aspects, a shared key must be separately accessed by two (or more) entities, e.g., the node and the network, in order for the entities to exchange information. In some aspects, separate keys must be accessed by two (or more) mobile entities (e.g., each component having its own unique key), in order for the entities to exchange information. The access by the separate entities may be required to be concurrent.

Split knowledge between the node and the network may be used to prevent unauthorized access by an entity that breaches the security of one component (e.g., the node). The split knowledge may include the node and the network separately having key components, where each component stores only its own key component. Each device may require a login from its own (separate) user, in order for the devices to share decrypted information. The logon may be controlled by a PIN, password, or biometric authentication that unlocks the component for general use. In other aspects, the logon may be a password or PIN dedicated to the described backup network.

In some aspects, node and network separately store different key components. Each component may require a login from its own (separate) user, in order for the entities to share decrypted information (via the radiocommunication network). The logon may be controlled by a PIN, password, or biometric authentication that unlocks the node and/or network for general use. In other aspects, the logon may be a dedicated password or PIN for the described backup network.

In some aspects, the split knowledge may include the node and network separately having key components, where each user knows only its own key component key. The individual key components may each contain insufficient information to decipher the original cryptographic key.

Dual control may be used to prevent unauthorized access, in the case of one component being hacked. The dual control may require users of the node and network to both perform a function (for example, logging in to their component, or entering a password dedicated to the described backup network). Each individual user may be unable to access or use the authentication credentials of another user.

In some aspects, both split knowledge and dual control are used to secure the described backup network.

In some aspects, there is provided a method for enabling continuity of access to a primary dataset stored in a computer network, in accordance with principles of the disclosure. The method may utilize a node connected to the computer network, a computer processor associated therewith, and one or more non-transitory computer-readable media storing computer-executable instructions. The instructions, when executed by the computer processor, may configure the node to be securely connectable to a radiocommunication network. The method may comprise the steps of:

- configuring the computer network to connect to the radiocommunication network;
- configuring the node to receive indication that the node is disconnected from the computer network, and (e.g., when the indication is received) to receive a copy of the primary dataset or a portion thereof from the computer network, via the radiocommunication network;
- configuring the node to enable operations on the copy and keep a record of the operations; and
- configuring the node to receive indication that the node is connected to the computer network and, when the indication is received, transmit the record to the computer network.

The aforementioned method for enabling continuity of access to a primary dataset stored in a computer network may include various aspects mentioned herein regarding the above-described system for enabling continuity of access to a primary dataset stored in a computer network, non-limiting examples of which are the following:

The mentioned copy of the primary dataset or a portion of the dataset may be received from another node of the computer network. The other node may be a node that is still connected to the primary computer network.

The described method may allow continuous or uninterrupted access to a computer network or a dataset stored on the network or on a portion of the network, for example a dataset containing data necessary for needed operations. Access may be enabled at times when a network is dysfunctional or loses connectivity, or when part of the network loses connectivity to the rest of the network.

In some aspects, execution of operations on the backup dataset copy generates a modified dataset copy. The modified copy may be stored on the node. When the node is reconnected to the original network, the modified dataset copy may be transmitted to the network.

The referred-to dataset operations may include modifications of datapoints in the dataset. For example, records of inventory, resource allocation, and financial numbers or metrics may need to be updated to reflect ongoing activities.

In some aspects, dataset operations may include transfer of data within the backup dataset stored on the disconnected node. In some aspects, data is transferred between different storage locations in the backup dataset. The architecture of the backup dataset may be designed to mirror or parallel the architecture of the principal or original dataset or network. When network access is restored, movement of data within the backup dataset is recapitulated in the principal dataset or network.

The described node and network may be configured to require cooperation between them. The cooperation may enable transmission of the dataset copy from the network to the node.

The mobile devices and disconnected nodes described herein may be in communication with an artificial intelligence and/or machine learning rule engine which, in turn, optionally may be further in communication with a historical rule repository or database and/or a master rule engine. The rule engine may be configured to input data into a quantum optimization engine to provide an output decision of an optimized configuration of the backup database and/or the backup dataset.

The aforementioned processing device or computer processor may be a computer, as described in more detail in FIG. 1, optionally including any of the components and elements described for FIG. 1.

Figure 2:
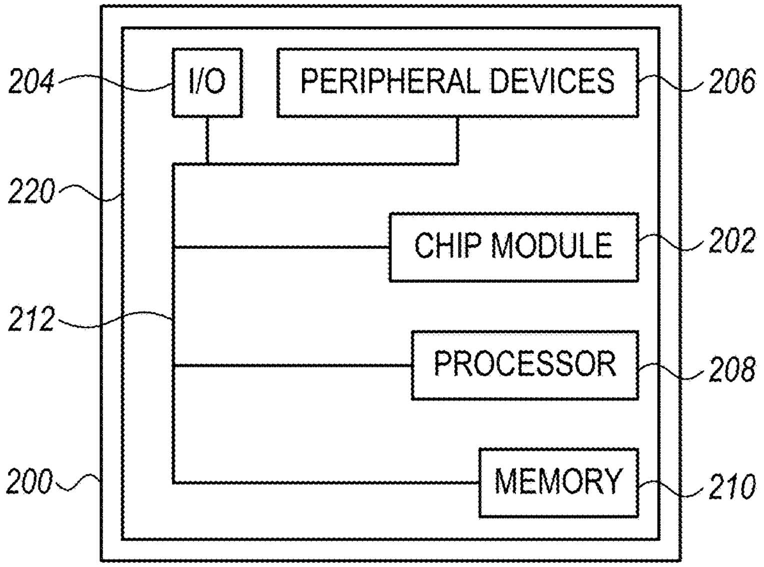
FIG. 2 shows an illustrative system in accordance with principles of the disclosure.

In some aspects, the processing device or computer processor may be a computer, as described in more detail in FIG. 2, optionally including any of the components and elements described for FIG. 2.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative, and other means of establishing a communications s link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
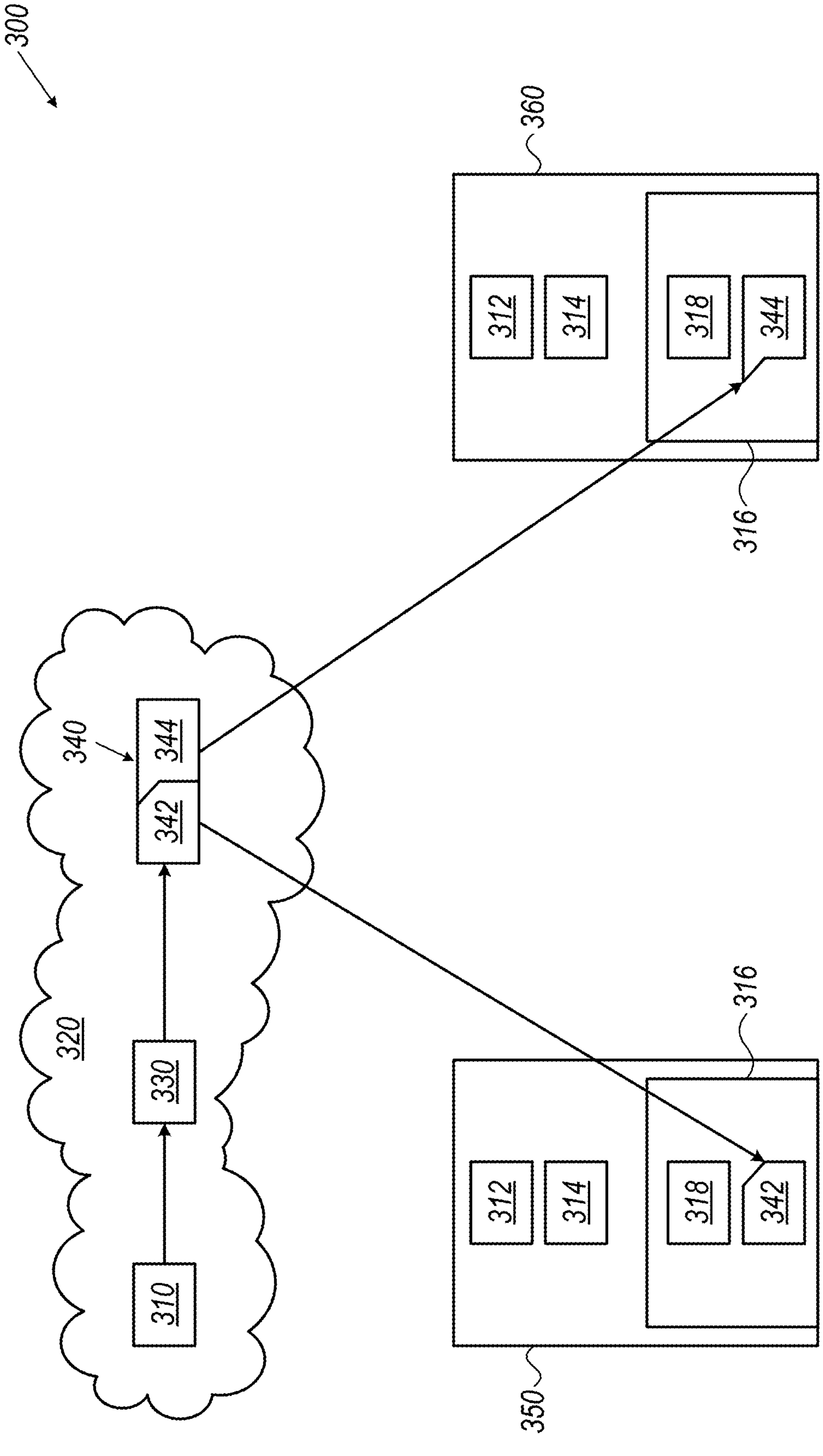
FIG. 3 provides a diagram of a system environment and data flow for a described method, in accordance with embodiments of the disclosure.

FIG. 3 provides a diagram of a system environment and data flow for a described method, in accordance with embodiments of the disclosure. The illustrative block diagram of method 300 includes a primary dataset 310, housed in a network 320. Network-associated processor 330 generates a copy 340 of primary dataset 310, which is divided into first portion 342 and second portion 344, which are transferred, respectively to first mobile device 350 and second mobile device 360. Each of first mobile device 350 and second mobile device 360 may include one or more communication components 312, one or more processor components 314, and one or more memory components 316. The one or more processor components 314 are operatively coupled to the one or more communication components 312 and the one or more memory components 316. The processors may include circuitry used for implementing the communication and/or logic functions of a particular system. For example, a processor component 314 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 314 may include functionality to operate one or more software programs based on computer-readable instructions 318 thereof, which may be stored in the one or more memory components 316. First portion 342 and second portion 344 may be stored in the respective memory components 316 of first mobile device 350 and second mobile device 360.

The network 320 illustrated in FIG. 3 may be a global area network (GAN), such as the Internet, a wide area network (WAN), a local area network (LAN), or any other type of network or combination of networks. The network 320 may provide for wireline, wireless, or a combination of wireline and wireless communication between systems, services, components, and/or devices on the network 320. The network may communicate with first mobile device 350 and second mobile device 360 via a cellular network (not depicted).

Figure 4:
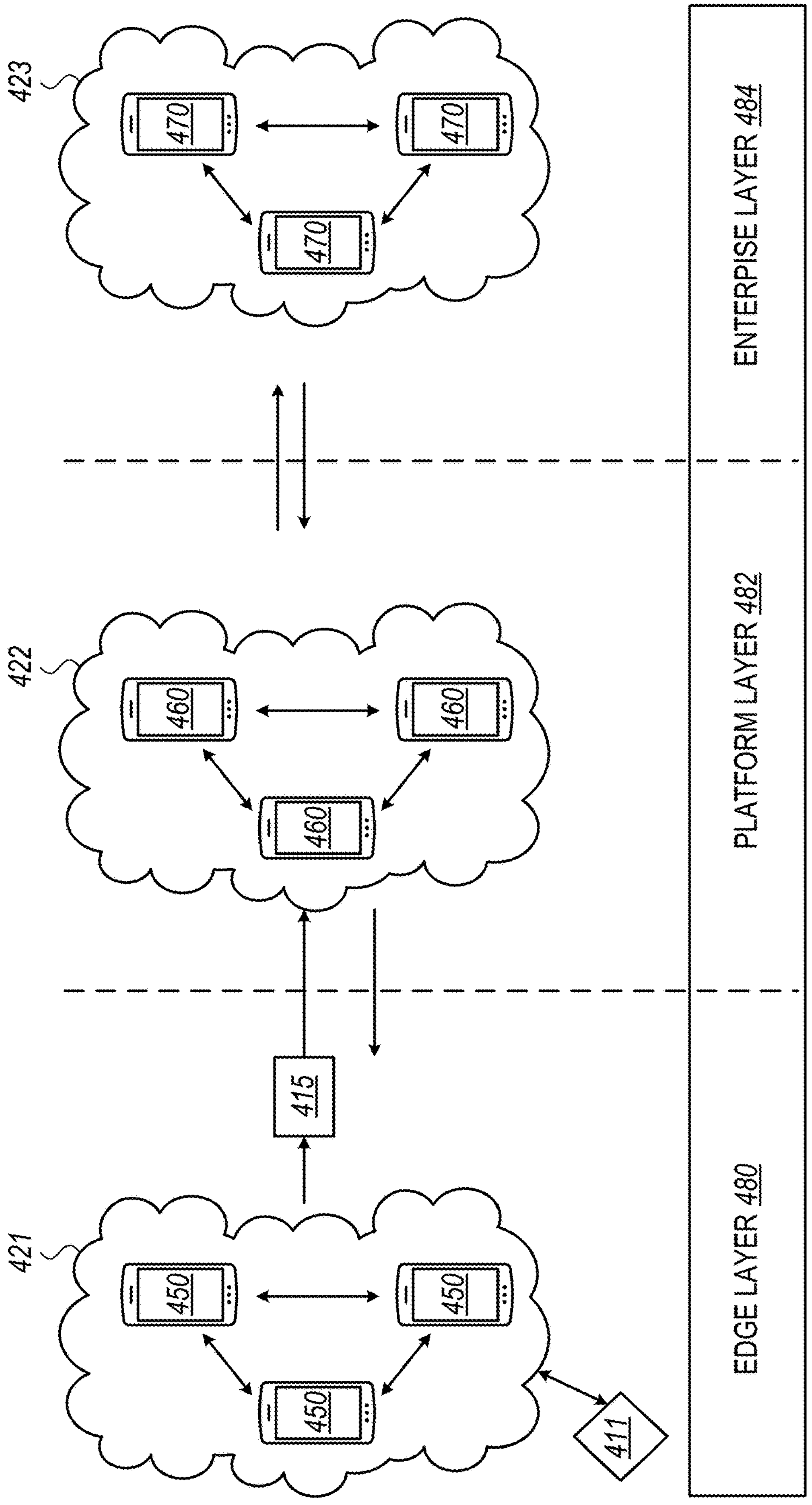
FIG. 4 is a simplified block diagram depicting a computing configuration of a backup network, in accordance with embodiments of the disclosure.

FIG. 4 is a simplified block diagram depicting a computing configuration of a backup network, in accordance with embodiments of the disclosure. Two or more mobile devices 450 are designated edge-layer device(s) and arranged in edge-level network 421. The edge-layer device(s) are configured to communicate with external entities and networks 411 and to communicate with platform-level network 422 via gateway 415, which may be a mobile device designated as a gateway. A second subset of (additional) mobile device(s) 460 are designated platform-layer device(s) and arranged in platform-level network 422. Optionally, a third subset of mobile device(s) 470 are designated enterprise-layer device(s) and arranged in enterprise-level network 423.

Figure 5:
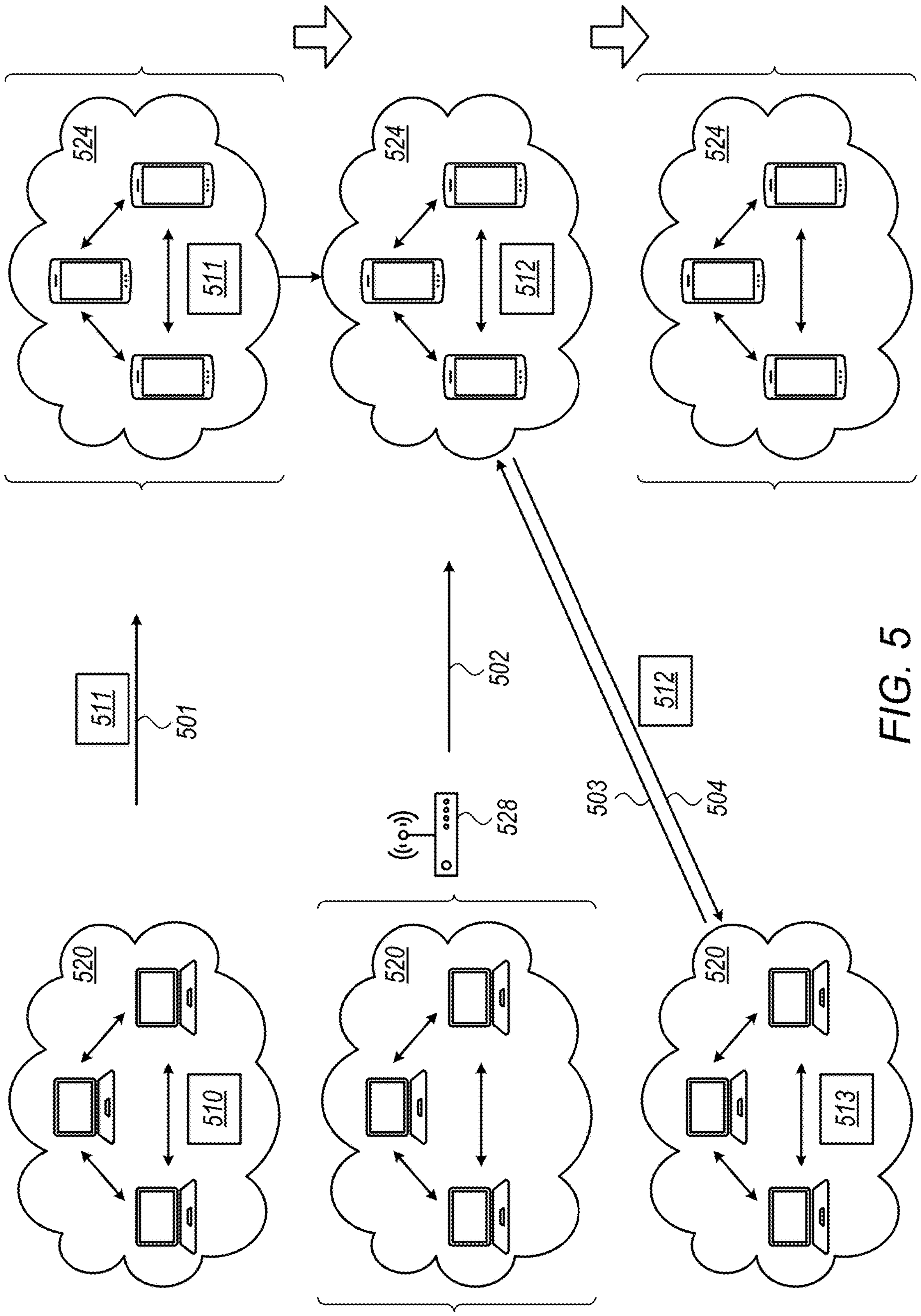
FIG. 5 shows a diagram of a system environment and data flow for a described method, in accordance with embodiments of the disclosure.

FIG. 5 shows a diagram of a system environment and data flow for a described multi-stage method, in accordance with embodiments of the disclosure. Stages are indicated by black arrows. In the initial stage (top row), principal (original) dataset 510 is stored on central network 520. Computer or network processor (not depicted) generates backup dataset 511, which may be identical to principal dataset 510 or a portion thereof; transmits backup dataset 511 to backup network 524 (arrow 501); and directs backup network 524 to store backup dataset 511 in distributed and encrypted form. Backup dataset 511 remains inactive and/or locked to modifications (indicated by brackets). In a second stage (middle row), processor receives indication that central network 520 or a portion thereof is malfunctioning or experiencing loss of connectivity. Processor transmits instructions (arrow 502) via transmitter 528 to backup network 524 to enable use of and/or operations on backup dataset 511. Simultaneously, principal dataset 510 is locked to modifications. Resulting modifications to backup dataset 511 generate modified backup dataset 512. In a third stage (bottom row), when connectivity is restored to central network 520, processor transmits, via transmitter (not depicted), indication of restoration of connectivity to backup network 524 (arrow 503). Backup network 524 locks modified backup dataset 512 to further operations or modifications. Processor transmits modified backup dataset 512 or a copy of (arrow 504) to central network 520, which stores it as replacement dataset 513, in place of principal (original) dataset 510.

Figure 6:
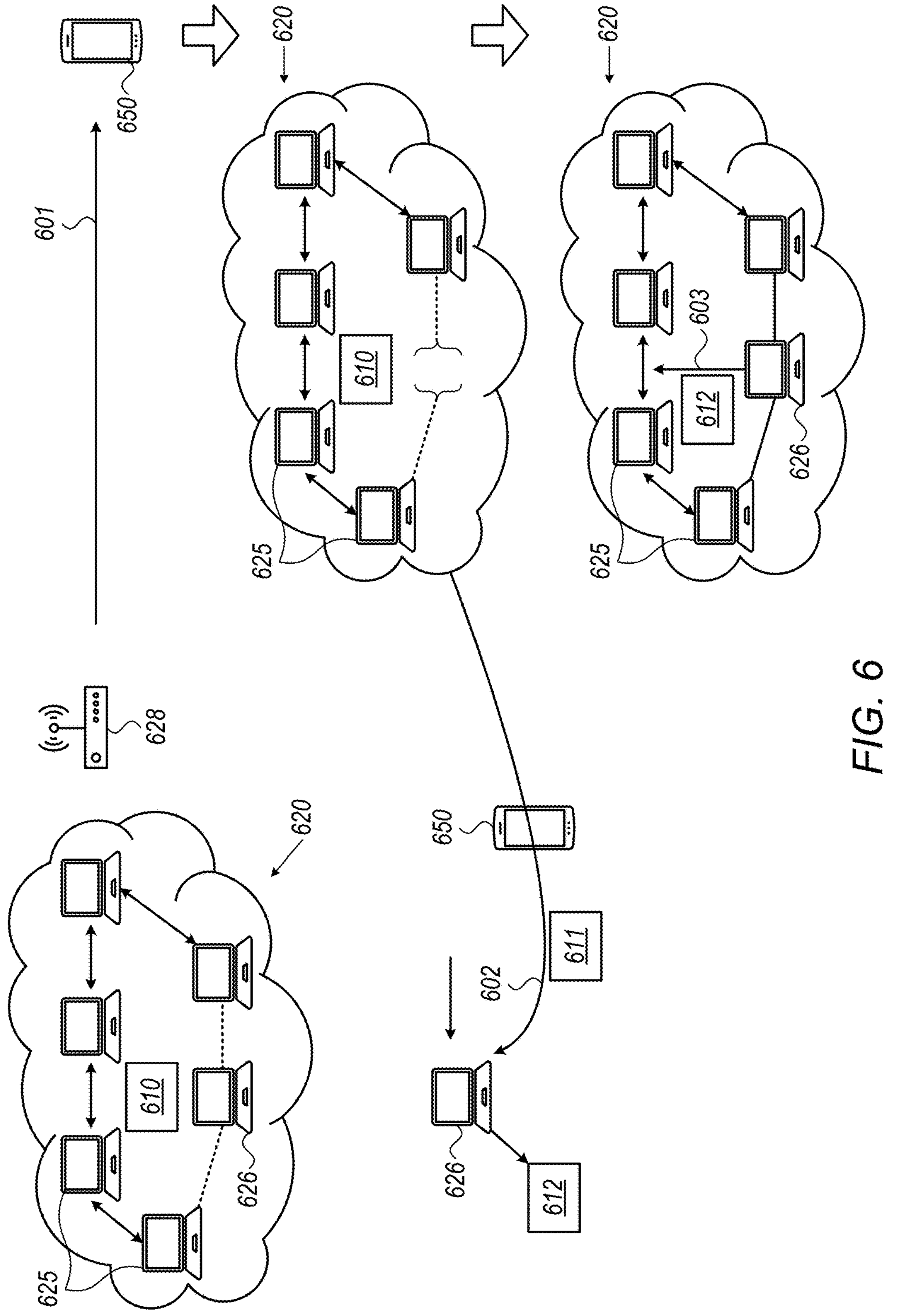
FIG. 6 shows a diagram of a system environment and data flow for a described method, in accordance with embodiments of the disclosure.

FIG. 6 shows a diagram of a system environment and data flow for a described method, in accordance with embodiments of the disclosure. Stages are indicated by black arrows. In the initial stage (top row), primary (original) dataset 610 is stored on computer network 620, which contains computer terminals that act as individual nodes 625. One or more nodes 626 become disconnected from the network (indicated by dotted lines). Computer network 620 transmits via transmitter 628 disconnection notification (arrow 601) to mobile device 650. In a second stage (middle row), partial computer network 620, which is disconnected from disconnected node (represented by empty brackets) generates a dataset copy 611 of primary dataset 610 and transmits, via transmitter (not depicted), dataset copy 611 to disconnected node 626, via mobile device 650 (arrow 602). Disconnected node 626 receives permission via mobile device 650 to perform operations on backup dataset 611, which generates modified backup dataset 612. In a third stage (bottom row), (formerly disconnected) node 626 is reconnected to computer network 620. Node 626 transmits modified backup dataset 612 to restored computer network 620 (arrow 603).

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with intelligently controlling data transfers between network connected devices and a platform layer application server.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory Computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for intelligently controlling data transfers between network connected devices and a platform layer application server, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a Computer-implemented process such that the one or more computer-executable program code portions which execute on the computer and/or programmable other apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

In some aspects of the described methods and systems, a regulated machine learning (ML) model is utilized. The regulated ML model is designed to make incremental learning adjustments in tandem with the determinations made by the machine learning engine and communicated to the regulated ML model. The machine learning engine accesses data outputted from backup datasets and backup network configurations, and it is trained to use this data to collectively formulate and approve incremental learning adjustments with the regulated ML model. The regulated ML model and the machine learning engine may consider input data patterns, output data patterns, thresholds for model performance, and/or distributions of identified patterns between different ML models.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products may improve access to datasets needed for ongoing operations of various entities, during network outages. Persons skilled in the art will appreciate that the present invention can be practiced by other than the described embodiments, which are presented for purposes of illustration rather than of limitation.

What is claimed is:

1. A method for enabling continuity of access to a primary dataset stored in a computer network, the method utilizing a computer processor and one or more non-transitory computer-readable media storing computer-executable instructions, wherein the instructions, when executed by the computer processor, create a backup dataset, the method comprising the steps of:

creating said backup dataset, said backup dataset comprising a copy of said primary dataset or a portion thereof;

distributing said backup dataset among a plurality of mobile devices; and instructing said plurality of mobile devices to store said backup dataset in encrypted form, in a stable memory, wherein decryption of said backup dataset requires cooperation of at least two of said plurality of mobile devices.

2. The method of claim 1, wherein said at least two of said plurality of mobile devices utilizes a key pair to gatekeep said decryption.

3. The method of claim 1, wherein said at least two of said plurality of mobile devices utilize a distributed ledger technology to gatekeep data operations.

4. The method of claim 1, further comprising the step of automatically updating said backup dataset by importing updates to said primary dataset.

5. The method of claim 1, wherein a first subset of said plurality of mobile devices are designated edge-layer device(s), and a second subset of said plurality of mobile devices are designated platform-layer device(s).

6. The method of claim 5, further comprising the step of establishing a trusted communication path between at least one of said edge-layer device(s) and at least one of said platform-layer device(s).

7. The method of claim 1, wherein said plurality of mobile devices are organized in a distributed network.

8. A method of accessing and utilizing a principal dataset stored in a central network, while said central network is inaccessible, the method utilizing a computer processor and one or more non-transitory computer-readable media storing computer-executable instructions, the method comprising the steps of:

programming said computer processor via said computer-executable instructions to:

create a backup dataset, said backup dataset comprising a copy of said principal dataset or a portion thereof; and distribute said backup dataset among a plurality of mobile devices associated with said central network, wherein:

said plurality of mobile devices are configured to store said backup dataset in encrypted form, in a stable memory;

decryption of said backup dataset requires cooperation of at least two of said plurality of mobile devices; and said backup dataset is by default locked to data manipulations, excepting updates received from said central network;

upon receipt of indication that said central network is inaccessible, instructing said plurality of mobile devices to enable operations on said backup dataset; and upon receipt of indication that said central network is accessible, updating said principal dataset by importing said backup dataset into said central network.

9. The method of claim 8, wherein said operations comprise modifications of datapoints.

10. The method of claim 8, wherein said operations comprise transfer of data.

11. The method of claim 8, wherein said computer processor is further programmed to, upon receipt of indication that said central network is inaccessible, lock said principal dataset to operations.

* * * * *